(12) United States Patent
Strand et al.

(10) Patent No.: US 11,427,675 B2
(45) Date of Patent: Aug. 30, 2022

(54) COPOLYESTERS FOR USE IN LOW SHEAR MELT APPLICATIONS

(71) Applicant: Eastman Chemical Company, Kingsport, TN (US)

(72) Inventors: Marc Alan Strand, Kingsport, TN (US); Laura Bauerle Weaver, Johnson City, TN (US); Robert Erik Young, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 125 days.

(21) Appl. No.: 16/690,314

(22) Filed: Nov. 21, 2019

(65) Prior Publication Data
US 2021/0155750 A1    May 27, 2021

(51) Int. Cl.
| | | |
|---|---|---|
| *C08G 63/20* | (2006.01) | |
| *B33Y 10/00* | (2015.01) | |
| *B33Y 70/00* | (2020.01) | |
| *B29C 64/153* | (2017.01) | |
| *C08J 3/28* | (2006.01) | |
| *C08J 5/00* | (2006.01) | |
| *B29K 67/00* | (2006.01) | |

(52) U.S. Cl.
CPC ............ *C08G 63/20* (2013.01); *B29C 64/153* (2017.08); *B33Y 10/00* (2014.12); *B33Y 70/00* (2014.12); *C08J 3/28* (2013.01); *C08J 5/00* (2013.01); *B29K 2067/00* (2013.01); *C08J 2367/02* (2013.01)

(58) Field of Classification Search
CPC ... B29C 64/153; B29K 2067/00; B33Y 10/00; B33Y 70/00; C08G 63/199; C08G 63/20; C08G 63/668; C08G 63/672; C08J 2367/02; C08J 3/28; C08J 5/00; C09D 167/025; C09D 5/03
See application file for complete search history.

(56) References Cited

U.S. PATENT DOCUMENTS

| | | | |
|---|---|---|---|
| 2,538,562 A | 1/1951 | Gustin et al. | |
| 4,250,280 A * | 2/1981 | Tanaka | C08G 63/672 525/400 |
| 4,524,165 A * | 6/1985 | Musser | C08K 5/3462 525/437 |
| 5,656,715 A * | 8/1997 | Dickerson | C08G 63/199 528/271 |
| 6,337,046 B1 * | 1/2002 | Bagrodia | C08K 7/00 264/328.18 |
| 8,851,880 B2 | 10/2014 | Nimmergut | |
| 2002/0188092 A1 * | 12/2002 | Moskala | B29C 33/60 528/272 |
| 2007/0224377 A1 * | 9/2007 | Leimbacher | C08L 67/02 428/36.92 |
| 2010/0152377 A1 * | 6/2010 | Chen | C08K 5/54 524/722 |

* cited by examiner

*Primary Examiner* — Frances Tischler
*Assistant Examiner* — Gennadiy Mesh
(74) *Attorney, Agent, or Firm* — Robert C. Morriss

(57) ABSTRACT

A method of manufacturing a molded article by a low shear manufacturing process that includes: placing a solid polyester in a mold having mold surfaces; heating said polyester until it becomes molten; dispersing said molten polyester over said mold surfaces; solidifying said molten polyester to form a solid molded article; and removing said molded article from said mold; where the polyester is obtained by polymerization of dimethylcyclohexane dicarboxylic acid, cyclohexane dimethanol, polytetramethylene ether glycol and branching agent and has a steep melting curve evidenced by a puddling curve slope of −2 to −10.

6 Claims, 1 Drawing Sheet

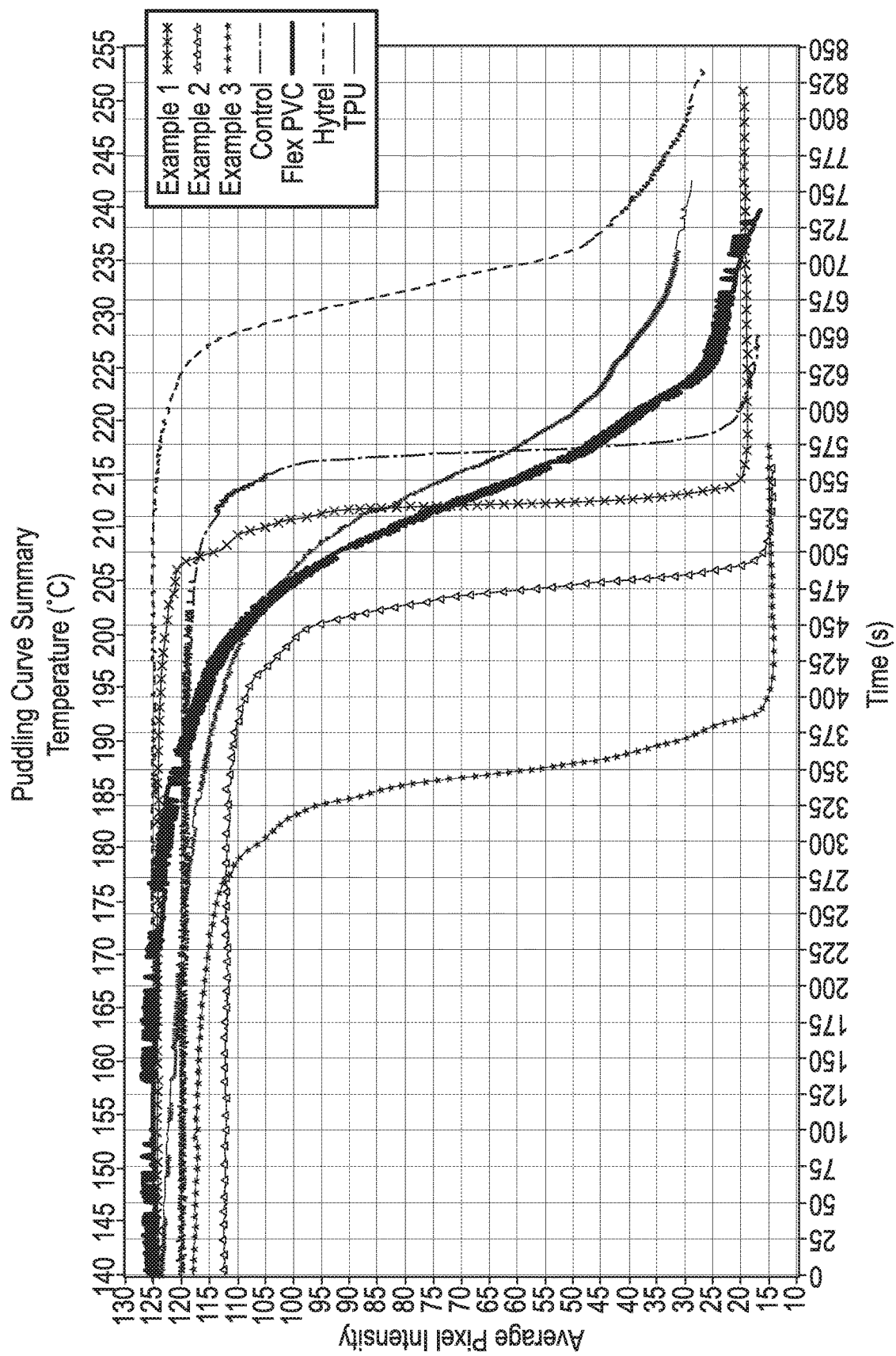

COPOLYESTERS FOR USE IN LOW SHEAR MELT APPLICATIONS

FIELD OF THE INVENTION

This invention pertains to polyester compositions. More particularly, this invention pertains to polyester compositions that have a sharp transition from solid to flowable melt, a steep viscosity curve with temperature resulting in minimal heating above the melting temperature for good flow and having minimal cooling requirements. This overall performance allows for reduced cycle times and improved production efficiency in low shear polymer melt processes such as rotational molding, powder slush molding, powder coating and 3D printing processes.

BACKGROUND OF THE INVENTION

Some polymer melt processing operations require polymers that can be processed at very low shear rate. These include rotomolding, powder slush molding, powder coating and powder fusion processes used in additive manufacturing. These techniques operate at very low to almost zero shear rates. Any shear or work applied to the material is based on flow properties of the material such as viscosity and surface tension. Very little mechanical work is added to the material to aid in the mold filling or melting stages. Most polymeric materials do not process easily in low shear processes. Thus, there is a need for polyesters that have a sharp transition from solid to flowable melt, that have a steep viscosity curve with temperature resulting in minimal heating above the melting temperature for good flow and have minimal cooling requirements. These requirements are fulfilled in the polyesters of this invention.

SUMMARY OF THE INVENTION

According to one embodiment of this invention, the present disclosure provides method of manufacturing an article by a low shear manufacturing process comprising melting a solid polyester having a puddling curve slope of −2 to −20 in a mold, dispersing the molten polyester onto the mold surface, solidifying the polyester to form a molded article and removing the molded article from the mold.

In another embodiment of this invention the polyester comprises:
 a. at least one dicarboxylic acid;
 b. at least one dihydroxy alcohol;
 d. at least one polyol; and
 e. optionally a multi-functionalized acid, alcohol or anhydride branching agent;
wherein said polyester has a puddling curve slope of −2 to −20.

In another embodiment of the invention the polyester comprises the residues of:
 a. cyclohexane dicarboxylic acid (CHDA), and dimethylcyclohexane (DMCD);
 b. cyclohexane dimethanol (CHDM),
 c. polytetramethylene ether glycol (PTMG), and
 d. trimelletic anhydride (TMA)
 wherein said polyester has a puddling curve slope of −2 to −8.

In yet another embodiment of the invention, the polyester comprises:
 a. 99 to 100 mole percent, based on the total molar acid content of the polyester, of a diacid selected from the group consisting of cyclohexane dicarboxylic acid (CHDA), dimethylcyclohexane (DMCD), and combinations thereof;
 b. 75 to 92 mole percent of cyclohexane dimethanol and 8 to 25 mole percent of polytetramethylene ether glycol based on the total glycol content of the polyester;
 c. optionally up to 1 mole percent of a branching agent selected from the group consisting of glycerin, pentaerythritol, phenyl dianhydride, trimellitic anhydride and combinations thereof based on the total molar acid content of the polyester; and
 wherein said polyester has a puddling curve slope of −2 to −8.

In another embodiment the invention comprises a method of coating a surface comprising:
 a. spreading a powdered solid polyester unto a surface;
 b. heating said powdered solid polyester to form a molten polyester coating; and
 c. cooling said molten polyester coating to form a solid polyester coating;
 wherein said polyester has a puddling curve slope of −2 to −20.

In another embodiment the invention comprises an additive manufacturing method for producing a three-dimensional object, said method comprising the steps of:
 a. applying a layer of polyester powder build material onto a target surface;
 b. directing electromagnetic wave energy at said powder to form a sintered layer;
 c. solidifying said sintered layer; and
 d. repeating steps (a) and (b) to form a three-dimensional object in a layerwise fashion;
 wherein said polyester comprises the residues of:
 i. 99 to 100 mole percent, based on the total molar acid content of the polyester, of a diacid selected from the group consisting of a cyclohexane dicarboxylic acid, a di methylcyclohexane dicarboxylic acid, and combinations thereof;
 ii. 75 to 92 mole percent of 1,4-cyclohexane dimethanol and 8 to 25 mole percent of polytetramethylene ether glycol based on the total glycol content of the polyester; and
 iii. optionally up to 1 mole percent of a branching agent selected from the group consisting of glycerin, pentaerythritol, phenyl dianhydride, trimellitic anhydride and combinations thereof based on the total molar acid content of the polyester; and
 wherein said polyester has a puddling curve slope of −2 to −8.

In yet another embodiment the invention comprises a polyester for low shear polymer melt processes comprising the residues of:
 a. 99 to 100 mole percent, based on the total molar acid content of the polyester, of a diacid selected from the group consisting of a cyclohexane dicarboxylic acid, a dimethylcyclohexane dicarboxylic acid, and combinations thereof;
 b. 75 to 92 mole percent of 1,4-cyclohexane dimethanol and 8 to 25 mole percent of polytetramethylene ether glycol based on the total glycol content of the polyester; and
 c. optionally up to 1 mole percent of a branching agent selected from the group consisting of glycerin, pentaerythritol, phenyl dianhydride, trimellitic anhydride and combinations thereof based on the total molar acid content of the polyester; and wherein said polyester has a puddling curve slope of −2 to −8.

BRIEF DESCRIPTION OF THE DRAWINGS

FIG. 1 is a plot of time in seconds and temperature in degrees Celsius against average pixel intensity depicting polyester puddling curves.

DETAILED DESCRIPTION

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps, if any, or ingredients is a convenient means for identifying discrete activities or ingredients and the recited lettering can be arranged in any sequence, unless otherwise indicated.

The term "polyester", as used herein, is synonymous with the term "resin" and is intended to mean a polymer prepared by the polycondensation of one or more specific diacid components, diol components, and optionally polyol components. The polyester of the present invention is suitable for use in low shear polymer melt processes such as rotational molding, powder slush molding, powder coating and 3D printing processes.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid monomer or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a curable, aliphatic polyester.

The term "polyol" used in this application refers to a polymeric diol such as polytetramethylene ether glycol (PTMG), polyethylene glycol, polypropylene glycol and the like. In some embodiments of this invention the polyols have an absolute molecular weight of from about 600 g/mol to about 5000 g/mol.

The term "branching agent" refers to an alcohol or an acid molecule with three or more functional groups. Examples of alcohol branching agents include glycerine, trimethylol propane and pentaerythritol. Trimellitic anhydride is an example of an acid based branching agent.

In normal extrusion and molding processes, polymeric materials are heated and processed in a mechanical mixer that converts the material from a solid to molten state. In these processes, significant amount of mechanical mixing and shear heating is used to help the fusion process and flow of the material. Some examples of mechanically assisted melt process include; single screw and twin-screw extrusion. This can include film and sheet extrusion, profile extrusion, extrusion blow molding. Extruders are also used to process polymeric materials for injection molding application. In addition to single screw and twin-screw extruders, Ferrell mixers, Banbury Mixers, Kokneaders and other mechanical processes are used to aid the melt fusion process. In these cases, mechanical energy is combined with heat to help the fusion process of conversing from a solid polymer to a flowable polymer melt.

Low shear manufacturing processes are those processes such as rotomolding, powder slush molding, powder coating and powder fusion processes used in additive manufacturing. In such low shear manufacturing processes, a polymeric material is taken from solid form to a molten form. The material then fuses together and, in some cases, flows to fill out a mold, flows together to create a stable part or smooth or textured finish surfaces depending on needs of the application. In these cases, there is minimal or no mechanical force added to the process to help the material melt and flow.

In the processes that are being addressed in this invention, heat is essentially the form of energy applied to the polymer to transition it from a solid material to a flowable polymer melt. This is also the major variable in generating sufficient melt flow to allow the material to fill the mold in the case of rotomolding or to fill a highly textured surface such as produced for automotive interior substrates or to flow together to form a smooth surface in the case powder coating or to fuse and/or consolidate powdered material in additive manufacturing.

Glass transition temperature (Tg), Melting point (Tm) and dynamic melt viscosity are often used to describe and design melt processing of thermoplastics. The Tg and the Tm determine at what temperature the solid material can be made to flow. The dynamic melt viscosity determines how it will flow. When talking about the dynamic melt viscosity it is often discussed as a shear rate dependent melt viscosity. Materials that show a consistent melt viscosity with changing shear rate are called Newtonian Fluids. Materials that show a viscosity drop with increasing shear rates are called non-Newtonian fluids and are shear thinning materials.

In the low shear applications that this invention is targeting, shear thinning is irrelevant. The shear levels applied in rotomolding, powder slush molding, powder coating and laser sintering are too low to see any effect of applied shear on changing melt viscosity. The only important viscosity measurement of materials used in low shear processes are temperature effects upon zero shear viscosity (or at least viscosity close to zero shear). Any effects of shear thinning will not be seen with the low level of shear that is present in the applications in which the polyesters of this invention have utility.

An ideal material for a low shear melt process would have the following characteristics:

It transitions from the solid state to the molten state easily.

The temperature range from solid state to flowable liquid is narrow.

The polymer has low melt viscosity to allow self-leveling and easy flow at process temperatures.

The melting temperature (Tm) is low enough to allow melt processing well below polymer degradation temperatures.

The polymer has an easy transition back to solid on cooling rendering a surface with high tear strength to facilitate removal of the molded-part from the surface of the mold cavity.

The polyester melting characteristics will highly affect the temperature window needed to run a process and the cycle time of the process. For example, in rotomolding, the mold is filled with powdered or micro-pelletized material at a temperature below the glass transition temperature (Tg) or Tm (depending on if the material is amorphous or crystalline). The mold is then rotated and taken into a heated chamber. The mold is heated until the material melts and flows to allow good filling of mold. The mold is then brought out of the heated chamber and rotation is continued as the mold cools until the part is solid enough to safely remove from the mold.

The peak temperature needs to be high enough to completely melt the material and get it to a low enough viscosity to flow well and completely fill the mold. The principles also apply to other low shear processes. In the rotomolding industry this transition is called "powder to puddle" and cooling to a solid part is called the "return process". The faster the entire process can be accomplished the better. Materials with very sharp melting characteristics and a steep temperature viscosity profile are advantageous to these processes and allow faster cycle times.

We have developed a family of materials that are particularly suited for low shear processing applications. They show a sharp transition from solid to flowable melt (narrow powder to puddle temperature range), a steep viscosity curve with temperature so that minimal heating above the puddle temperature is needed for good flow, and their cooling requirements are minimal because of the first two factors. This overall performance allows for reduced cycle times and improved production efficiency in low shear polymer melt processes.

In some embodiments of this invention the dicarboxylic acid components of this invention may include at least one dicarboxylic acid compound, its diester derivative, its anhydride, or a combination thereof. The dicarboxylic acid compounds are capable of forming ester linkages with diol or polyol compounds.

In some embodiments of this invention the dicarboxylic acid components of this invention may include alicyclic diacids such as, but are not limited to, hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, cyclohexane dicarboxylic acid (including the 1, 2-; 1,3-; and 1,4-isomers) (CHDA), dimethylcyclohexane (including the 1, 2-; 1,3-; and 1,4-isomers) (DMCD) and mixtures thereof.

In some embodiments of this invention the dicarboxylic acid components of this invention may include acyclic aliphatic diacids such as, but are not limited to adipic acid, maleic anhydride, maleic acid, fumaric acid, itaconic anhydride, itaconic acid, citraconic anhydride, citraconic acid, dodecanedioic acid, succinic acid, succinic anhydride, glutaric acid, sebacic acid, azelaic acid, and mixtures thereof.

In some embodiments of the invention the hydroxyl component of the polyester may include di-alcohol components such as, but are not limited to 2,2,4,4-tetraalkylcyclobutane-1,3-diol (such as 2,2,4,4-tetramethylcyclobutane-1,3-diol), 2,2-dimethyl-1,3-propanediol (neopentyl glycol), 1,2 cyclohexanedimethanol, 1,3-cyclohexanedimethanol, 1,4 cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, and tetraethylene glycol.

In some embodiments of this invention the polyol includes, but is not limited to, polytetramethylene ether glycol (PTMG), polyethylene glycol, polypropylene glycol and mixtures thereof.

In some embodiments of this invention the optional branching agent may include multi-functionalized acids, alcohols, anhydrides and combinations thereof.

In some embodiments of this invention, the optional branching agent includes but is not limited to 1,1,1-trimethylol propane, 1,1,1-trimethylolethane, glycerin, pentaerythritol, erythritol, threitol, dipentaerythritol, sorbitol, neopentyl glycol, phenyl dianhydride, hexanediol, trimelletic anhydride (TMA) and combinations thereof.

In some embodiments of the invention, the diacid component of the polyester includes cyclohexane dicarboxylic acid (CHDA), and dimethylcyclohexane (DMCD), and combinations thereof, the diglycol component of the polyester includes cyclohexane dimethanol (CHDM), and the polyol includes polytetramethylene ether glycol (PTMG).

In some embodiments of the invention, the diacid component of the polyester includes cyclohexane dicarboxylic acid (CHDA), and dimethylcyclohexane (DMCD), and combinations thereof, the diglycol component of the polyester includes cyclohexane dimethanol (CHDM), the polyol includes polytetramethylene ether glycol (PTMG), and the branching agent includes trimelletic anhydride (TMA).

EXAMPLES

The invention has been described in detail with particular reference to preferred embodiments thereof, but it will be understood that variations and modifications can be implemented within the spirit and scope of the invention.

In order to characterize the unique powder to puddle characteristics of the polyesters of this invention, a test apparatus was used.

The materials in the examples (Ecdel™ 9966 available commercially from Eastman chemical Company, example 1, 2 and 3) are all copolyesters based on a combination of cyclohexane dicarboxylic acid and cyclohexane dimethanol with polytetramethylene ether glycol having a molecular weight of 1000 (PTMG 1000). In the polyester synthesis process CHDA and/or dimethylcyclohexane dicarboxylic acid (DMCD) can be used depending on the process. Trimelletic anhydride (TMA) can be used in the formula up to about 1%.

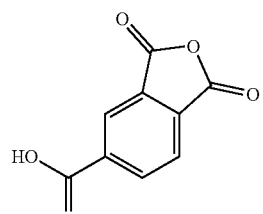

Trimelletic Anhydride (TMA)

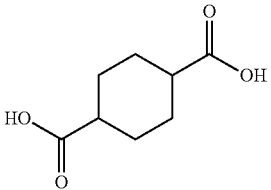

1,4-Cyclohexane Dicarboxylic Acid

-continued

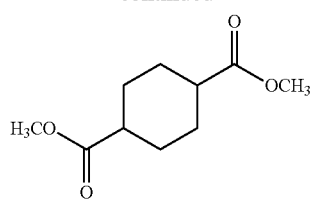

1,4-Dimethylcyclohexane dicarboxylic acid

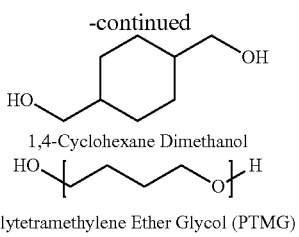

1,4-Cyclohexane Dimethanol

Polytetramethylene Ether Glycol (PTMG)

Experimental Procedure:

Polytetramethylene ether glycol (PTMG) available commercially from BASF, and DMCD, TMA and CHDM available commercially from Eastman Chemical Company were used to make the polyester samples. The following raw materials were charged to a 500-ml flask to produce a 100 gram batch of polymer:

DMCD 55.78 g
TMA 0.25 g
Irganox 1010 0.20 g (Pentaerythritol tetrakis(3,5-di-tert-butyl-4-hydroxyhydrocinnamate available commercially from BASF) was used as an oxidative stabilizer
PTMG (HEIOOO) 25.1 g
CHDM (16) 37.58 g (includes 2% excess)
Ti 70 pmm catalyst The following polymerization sequence is shown in Table 1:

TABLE 1

| TIME (MINUTES) | TEMPERATURE (° C.) | PRESSURE (TORR) | STIR SPEED (RPM) |
| --- | --- | --- | --- |
| 0 | 220 | 760 | 0 |
| 2 | 220 | 760 | 25 |
| 1 | 220 | 760 | 158 |
| 60 | 220 | 760 | 158 |
| 25 | 270 | 760 | 158 |
| 1 | 270 | 0 | 158 |
| 10 | 270 | 0 | 158 |
| 1 | 270 | 0 | 60 |
| 5 | 270 | 0 | 60 |
| 1 | 270 | 0 | 16 |
| 1 | 270 | 100 | 0 |

The polyesters of this invention are shown in Table 2:

TABLE 2

| Raw Material | Ecdel 9966 | Example 1 | Example 2 | Example 3 |
| --- | --- | --- | --- | --- |
| CHDA or DMCD | 99.5 mole % | 99.5 mole % | 99.5 mole % | 99.5 mole % |
| TMA | 0.5 mole % | 0.5 mole % | 0.5 mole % | 0.5 mole % |
| CHDM | 91.1 mole % | 85 mole % | 80 mole % | 75 mole % |
| PTMG | 8.9 mole % | 15 mole % | 20 mole % | 25 mole % |

In order to quantify the powder to puddle characteristics of the inventive polyesters, a test apparatus was build as described herein below.

System Hardware:

The system was designed around a Nikon SMZ1000 stereo microscope, although other. A Point Grey Research Flea3 color camera (available from FLIR Integrated Imaging Solutions, Inc.) was used to capture images from the microscope's objective. A 1" CCD C-mount adapter from SPOT Imaging Solutions was used to combine the camera with the microscope. Two Zaber LSM 200A linear stages (available from Zaber Technologies Inc.) were coupled to create an X/Y stage system for quickly adjusting a sample's position. A Linkam DSC 600 hot stage system (available from Linkam Scientific Instruments) was used for controlling heating and cooling cycles during experiments. Additionally, a fiber optic halogen lamp system was used for sample illumination.

System Software:

Software to integrate the digital camera and hot stage systems was written using National Instruments (NI) Labview 2016. Using ActiveX drivers provided by Linkam, the hot stage manufacturer, it was possible to send and receive serial commands to and from the hot stage apparatus. This, coupled with NI's Imaqdx drivers, allowed for the creation of images with temperature and time information displayed as an overlay. Drivers for controlling the X and Y stage were also added to the software package to allow users to accurately control sample positions. A simple user interface gave users the ability to run a hot stage experiments quickly with high repeatability. Data was then written to a PC's hard drive in an audio video interleave (AVI) format and could then be reviewed using Window's Media Player. An additional data processing program was also written to provide a semi-quantitative measurement of the time each sample took to melt. This was accomplished using a customized image processing algorithm, written using Labview. The basis for the algorithm involved quantifying the mean pixel intensity for each image taken of a sample. As powder samples were melted they typically experienced a visual change from white to clear. Due to this effect, the mean pixel intensity for an image correlated directly to the physical state of a sample. Therefore, this pixel intensity value could be compared to time, generating a graphical representation of the melting process.

Method:

Each of the selected materials was melted in an identical fashion using a programmable differential scanning calorimetry (DSC) hot stage. These melting processes were recorded using a microscope and digital camera system for sample comparison. Images from these video files could also be processed using image analysis techniques to generate graphical representations for each melting process. Overlaying these melt-curves upon each other provided semi-quantitative comparisons of separate samples.

The puddling test is a measure time at temperature it takes for a polyester to go from an opaque solid to a clear melt. The x-axis is time on the bottom and temperature on the top. The y-axis is a measure of pixel intensity. High pixel intensity is opaque (un-melted solid) and low pixel intensity is transparent (molten liquid). The results are shown in FIG. 1.

The slope of the line during the steepest transition is given in the Table 3:

TABLE 3

| Sample | Slope = change in pixel intensity/change in time (s) |
| --- | --- |
| Hytrel (DuPont) | −1.0 |
| TPU (Lubrizol) | −0.6 |
| Flexible PVC formulation | −0.65 |
| Ecdel 9966 (Eastman) | −5.0 |
| Example 1 | −8.0 |
| Example 2 | −3.4 |
| Example 3 | −2.4 |

The steepness of the slope correlates with the speed or temperature range needed for the transition from an opaque solid mass to a clear melt. The slope of the lines in the plot above can be used as a proxy for the speed of melting or the melting range of a material. Melting points for polymers are reported as a single number. However, polymeric materials typically do not have a single melting temperature. Instead, polymers have a melting range. In low shear processes, high speed melting or a narrow melting temperature range will result in faster processing cycle times. The inventors believe that polyesters within the scope of this invention have a slope of −2 to −20 and have a sharp transition from solid to flowable melt, a steep viscosity curve with temperature resulting in minimal heating above the melting temperature for good flow and having minimal cooling requirements. In some embodiments of this invention the polyesters of this invention can have a slope of −2 to −15. In other embodiments of this invention the polyesters have a slope of −2 to −10 and in yet other embodiments of this invention the polyesters have a slope of −2 to −8. These characteristics allow for reduced cycle times and improved production efficiency in low shear polymer melt processes such as rotational molding, powder slush molding, powder coating and 3D printing processes.

The invention has been described in detail with reference to the embodiments disclosed herein, but it will be understood that variations and modifications can be effected within the spirit and scope of the invention.

We claim:

1. A method of manufacturing a molded article by a low shear manufacturing process comprising:
   a. placing a solid polyester in a mold having mold surfaces;
   b. heating said polyester until it becomes molten;
   c. dispersing said molten polyester over said mold surfaces;
   d. solidifying said molten polyester to form a solid molded article; and
   e. removing said molded article from said mold;
   wherein said polyester comprises:
   a. 99 to 100 mole percent, based on the total molar acid content of the polyester, of a diacid selected from the group consisting of a cyclohexane dicarboxylic acid, a dimethylcyclohexane dicarboxylic acid, and combinations thereof;
   b. 75 to 92 mole percent of 1,4-cyclohexane dimethanol and 8 to 25 mole percent of polytetramethylene ether glycol based on the total glycol content of the polyester; and
   c. a branching agent in an amount from 0.5 to 1 mole %, said branching agent selected from the group consisting of glycerin, pentaerythritol, phenyl dianhydride, trimellitic anhydride and combinations thereof based on the total molar acid content of the polyester;
   wherein said polytetramethylene ether glycol has a number average molecular weight of 600-5000, and
   wherein said polyester has a puddling curve slope of −2 to −10 determined by the steepest change in pixel intensity/change in time, wherein pixel intensity is measure by capturing images of a polyester sample from a microscope's objective with a digital camera as the sample is heated from 140° C. at a rate of 10° C./75 seconds using differential scanning calorimetry (DSC).

2. The method of claim 1 wherein said branching agent is trimelletic anhydride; and
   wherein said polyester has a puddling curve slope of −2 to −8.

3. The method of claim 1 wherein said polyester comprises:

a. 80 to 92 mole percent of 1,4-cyclohexane dimethanol and 8 to 20 mole percent of polytetramethylene ether glycol based on the total glycol content of the polyester; and wherein said polyester has a puddling curve slope of −2 to −8.

4. A method of coating a surface comprising:
   a. spreading a powdered solid polyester unto a surface;
   b. heating said powdered solid polyester to form a molten polyester coating; and
   c. cooling said molten polyester coating to form a solid polyester coating;

wherein said polyester comprises:
   a. 99 to 100 mole percent, based on the total molar acid content of the polyester, of a diacid selected from the group consisting of a cyclohexane dicarboxylic acid, a dimethylcyclohexane dicarboxylic acid, and combinations thereof;
   b. 75 to 92 mole percent of 1,4-cyclohexane dimethanol and 8 to 25 mole percent of polytetramethylene ether glycol based on the total glycol content of the polyester; and
   c. a branching agent in an amount from 0.5 to 1 mole %, said branching agent selected from the group consisting of glycerin, pentaerythritol, phenyl dianhydride, trimellitic anhydride and combinations thereof based on the total molar acid content of the polyester;

wherein said polytetramethylene ether glycol has a number average molecular weight of 600-5000, and wherein said polyester has a puddling curve slope of −2 to −10 determined by the steepest change in pixel intensity/change in time, wherein pixel intensity is measure by capturing images of a polyester sample from a microscope's objective with a digital camera as the sample is heated from 140° C. at a rate of 10° C./75 seconds using differential scanning calorimetry (DSC).

5. An additive manufacturing method for producing a three-dimensional object, said method comprising the steps of:
   a. applying a layer of polyester powder build material onto a target surface;
   b. directing electromagnetic wave energy at said powder to form a sintered layer;
   c. solidifying said sintered layer; and
   d. repeating steps (a) and (b) to form a three-dimensional object in a layerwise fashion;

wherein said polyester comprises the residues of:
   i. 99 to 100 mole percent, based on the total molar acid content of the polyester, of a diacid selected from the group consisting of a cyclohexane dicarboxylic acid, a dimethylcyclohexane dicarboxylic acid, and combinations thereof;
   ii. 75 to 92 mole percent of 1,4-cyclohexane dimethanol and 8 to 25 mole percent of polytetramethylene ether glycol based on the total glycol content of the polyester; and
   iii. a branching agent in an amount from 0.5 to 1 mole %, said branching agent selected from the group consisting of glycerin, pentaerythritol, phenyl dianhydride, trimellitic anhydride and combinations thereof based on the total molar acid content of the polyester;

wherein said polytetramethylene ether glycol has a number average molecular weight of 600-5000, and wherein said polyester has a puddling curve slope of −2 to −8 determined by the steepest change in pixel intensity/change in time, wherein pixel intensity is measure by capturing images of a polyester sample from a microscope's objective with a digital camera as the sample is heated from 140° C. at a rate of 10° C./75 seconds using differential scanning calorimetry (DSC).

6. The method of claim 3 wherein said polyester has a puddling curve slope of −3.4 to −8.

* * * * *